US008667255B2

(12) United States Patent  
Alapati et al.

(10) Patent No.: US 8,667,255 B2  
(45) Date of Patent: Mar. 4, 2014

(54) MEASURING RUNTIME COVERAGE OF ARCHITECTURAL EVENTS OF A MICROPROCESSOR

(75) Inventors: Sangram Alapati, Austin, TX (US); Jayakumar N Sankarannair, Bangalore (IN); Varun Mallikarjunan, Bangalore (IN); Prathiba Kumar, Tamilnadu (IN); Satish Kumar Sadasivam, Tamilandu (IN)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/895,034

(22) Filed: Sep. 30, 2010

(65) Prior Publication Data

US 2012/0084538 A1 Apr. 5, 2012

(51) Int. Cl.  
*G06F 9/30* (2006.01)

(52) U.S. Cl.  
USPC ......................................................... 712/227

(58) Field of Classification Search  
USPC ......................................................... 712/227  
See application file for complete search history.

(56) References Cited

U.S. PATENT DOCUMENTS

| 5,724,504 | A  * | 3/1998  | Aharon et al. ............ 714/33 |
| 6,021,488 | A  * | 2/2000  | Eisen et al. ............ 712/228 |
| 6,356,858 | B1   | 3/2002  | Malka et al. |
| 6,647,513 | B1   | 11/2003 | Hekmatpour |
| 7,114,111 | B2 * | 9/2006  | Noy ............................. 714/738 |
| 7,373,619 | B2   | 5/2008  | Johnson |
| 7,467,364 | B2   | 12/2008 | Hekmatpour |
| 2004/0210431 | A1 * | 10/2004 | Bierman et al. ............ 703/17 |
| 2006/0075153 | A1 * | 4/2006  | Martin ............................. 710/15 |
| 2007/0113060 | A1 * | 5/2007  | Lien et al. .................... 712/244 |
| 2007/0261038 | A1 * | 11/2007 | Suba et al. .................... 717/136 |
| 2008/0255822 | A1   | 10/2008 | Adir et al. |
| 2009/0171647 | A1   | 7/2009  | Mannava et al. |

OTHER PUBLICATIONS

Flavio M. DePaula, Marcel Gort, Alan J. Hu, Steven J. E. Wilson, Jin Yang; "BackSpace: Formal Analysis for Post-Silicon Debug"; http://www.cs.ubc.ca/~depaulfm/fmcad08_final.pdf.

* cited by examiner

*Primary Examiner* — Keith Vicary  
(74) *Attorney, Agent, or Firm* — Yudell Isidore Ng Russell PLLC

(57) ABSTRACT

A post-silicon testing apparatus, method, and computer program product provide for runtime coverage measurement methodology to measure the architectural events in hardware. Measurement of all architectural events discernable from the instructions and architectural state changes are tracked and recorded. A mechanism to ensure capturing of maskable events is also provided. A feedback driven test-generation approach is enabled by the runtime coverage measurement. The runtime coverage measurement system presents a live view of the comprehensive architectural event coverage to the user/tester. The methodology can be implemented on an operating system environment and also as a standalone/bare-metal tool.

20 Claims, 7 Drawing Sheets

MEASURING RUNTIME COVERAGE OF ARCHITECTURAL EVENTS OF A MICROPROCESSOR

BACKGROUND

1. Technical Field

The present disclosure generally relates to validation and verification testing and more specifically to a method and system for coverage measure testing at an architectural level of integrated circuitry.

2. Description of the Related Art

Microprocessors are being built with complex architectures comprising a number of functional units. The state space of the processor architecture is very large, given the range of input values and architecture states in various execution units, such as Floating Point (FP) Units, vector units, and integer units and given the interaction between various units and the combination of events of various units. This huge state space necessitates extensive testing, while ensuring maximal coverage in minimal time. The coverage statistics are complex and are not apparent from the test case. Determining appropriate coverage in test case generators presents a lot of redundancy and creates enormous overhead in execution time.

BRIEF SUMMARY

Disclosed are a method, a data processing system and a computer program product for measuring coverage of architectural events through real-time execution of instructions on hardware, which can be used to assess the coverage of events of any given stream of instructions.

In one embodiment, a computer implemented method is provided for integrated circuit testing. On execution of each of a plurality of instructions of a test case, a current architecture state of a processor under test is analyzed to detect architectural state events and coverage statistics are recorded. A next instruction is decoded. A coverage statistic is also discerned from the next instruction. A determination is made whether any architectural state event is subject to being masked based on execution of the next instruction. The architectural state events are recorded, including any maskable event due to execution of a prior instruction, and the maskable event is reset. The decoded next instruction is imparted to the processor under test for a single step execution.

In one embodiment, events such as sticky bits (e.g., a register overflow exception bit) are captured that would otherwise be obscured during single step execution testing of post-silicon validation. For example, capture can be performed by bitwise logical OR operation between a current architectural state and a prior architecture state. Upon determining that the test case is complete, the coverage statistics are collated.

In another embodiment, a data processing system is provided for integrated circuit testing. A computer-readable storage medium stores architectural state events and a test case. A utility provides the following functions for each of a plurality of instructions of the test case: For each of a plurality of instructions of a test case, a current architecture state of a processor under test is analyzed to detect architectural state events. A next instruction is decoded. A coverage statistic is discerned from the next instruction. A determination is made whether any architectural state event is subject to being masked based on execution of the next instruction. The architectural state events are recorded, including any maskable event due to execution of a prior instruction, and the maskable event is reset. The decoded next instruction is imparted to the processor under test for a single step execution.

In an additional embodiment, a computer program product is provided for integrated circuit testing. Program code is embedded on the computer usable storage medium that when executed by a processor of a data processing system performs the following functions: For each of a plurality of instructions of a test case, a current architecture state of a processor under test is analyzed to detect architectural state events. A next instruction is decoded. A coverage statistic is discerned from the next instruction. A determination is made whether any architectural state event is subject to being masked based on execution of the next instruction. The architectural state events are recorded, including any maskable event due to execution of a prior instruction, and the maskable event is reset. The decoded next instruction is imparted to the processor under test for a single step execution.

In one particular aspect, a utility performs runtime coverage measurement of architectural events in hardware under test, such as a processor, during a course of execution of a test case. The utility can be executed as a standalone tool or on an operating system environment. Methodologies performed by the utility can measure the coverage of maskable events using various data structures to save and reset maskable values. The maskable events are compared with an architecture state upon execution of an instruction, and the architecture state is restored. Runtime feedback can be provided of the architectural events to the test generator to generate effective test cases. The runtime feedback can enable coverage of all of the states in a reduced amount of time. A live view can be provided of the architectural event coverage data during the course of execution of the test case.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present innovation will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
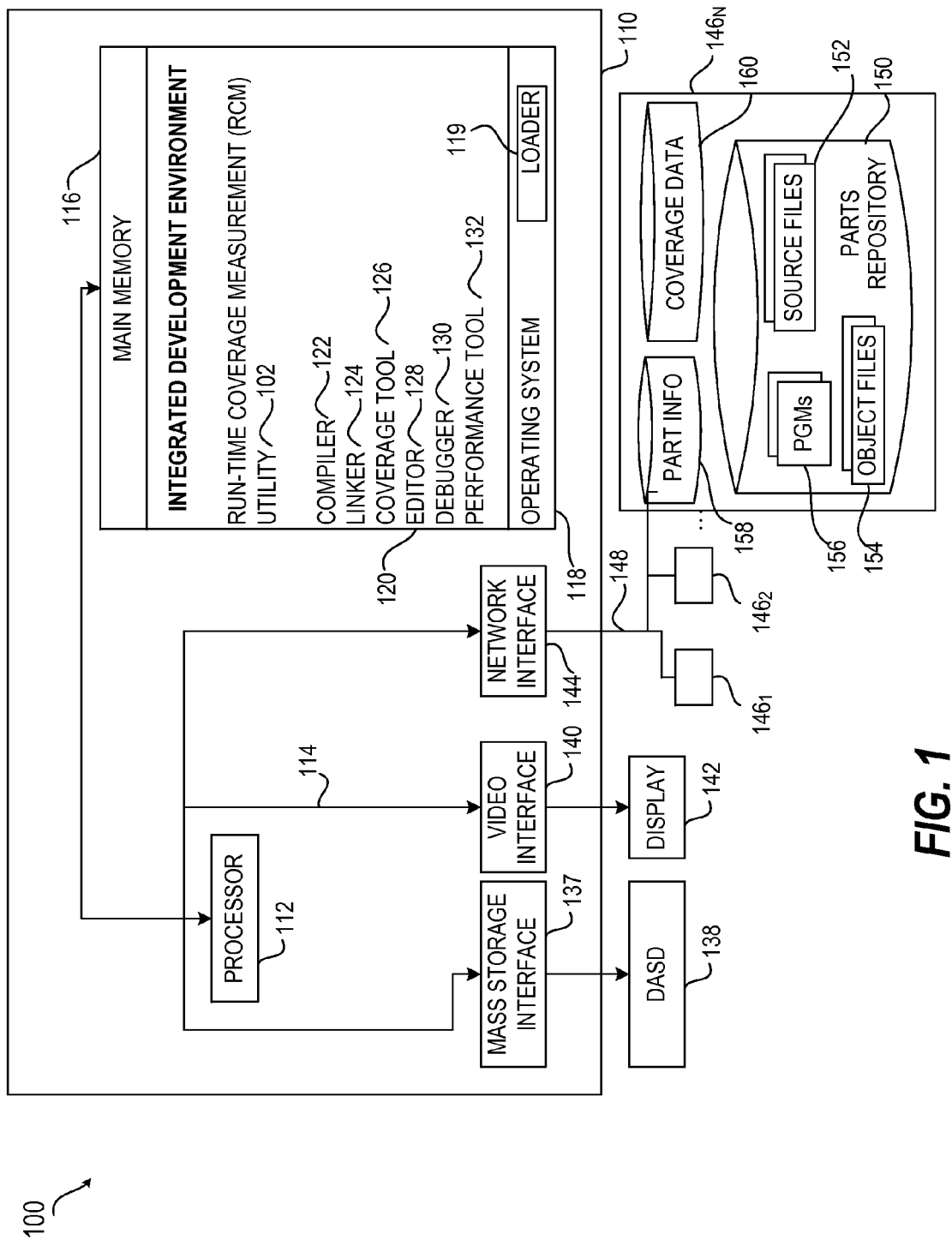
FIG. 1 provides a block diagram representing a computer system for implementing a coverage measure system, according to one embodiment.

The illustrative embodiments provide a method, data processing system and computer program product to measure coverage statistics of architectural events of a processor integrated circuit (IC) at the instruction level. A test case is executed in a coverage mode by single-stepping, and the coverage statistics are accumulated on completion of execution of every instruction. The architectural event occurrences are reconstructed and recorded by analyzing the instruction (e.g., opcode, registers, data, etc.) and change in the architecture state after every instruction. Architecture state is tracked and modified where necessary to ensure that the events that could go unnoticed are recorded (e.g., setting of sticky bits). The disclosed innovation goes beyond single stepping and saving the state of the processor. Since the coverage measurement involves recording of various events, there are many instances in which the recording of events is not straightforward. Various detailed and minute techniques are used to ensure that events are not lost that arise because of the hardware behavior of the system. Thus, the disclosed method performs comprehensive coverage of architectural events (i.e., events that are visible or can be deduced from the architecture state).

In the following detailed description of exemplary embodiments of the innovation, specific exemplary embodiments in which the innovation may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present innovation. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element can be provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components, devices and/or parameters herein, without limitation. Each term utilized herein is to be given its broadest interpretation given the context in which that term is utilized.

As further described below, implementation of the functional features of the presented embodiments is provided within processing devices/structures and involves use of a combination of hardware, firmware, as well as several software-level constructs (e.g., program code). The presented figures illustrate both hardware components and software components within example data processing.

Referring now to FIG. 1, in one embodiment, a distributed computing environment 100 is shown for executing a Runtime Coverage Measurement (RCM) utility 102 for measuring the coverage in hardware under test (e.g., a microprocessor) during the course of execution of test cases. In general, the distributed computing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture.

As utilized throughout the description of the various embodiments, RCM utility 102 may provide the general functional features of the invention. In the described embodiments, processor 112 executes RCM utility 102 (as well as or in conjunction with OS 118), and RCM utility 102 enables the processor 112 of computer system 110 to perform certain functions when specific code segments are executed by processor 112. Among the program code/instructions or processing logic provided by RCM utility 102, and which are specific to the invention, are code/logic for the processor-executed utility to perform the functions of: (a) for each of a plurality of instructions of a test case: analyzing a current architecture state of test hardware under test to detect architectural state events; decoding a next instruction; discerning a coverage statistic from the next instruction; and determining whether any architectural state event is subject to being masked based on execution of the next instruction, wherein the event that is subject to being masked is a maskable event; recording the architectural state events including any maskable event due to execution of a prior instruction; resetting the maskable event; and forwarding the decoded next instruction to the hardware under test for a single step execution.

During execution of RCM utility 102, one or more of the embedded components/modules can execute independent of the other components/modules. In at least one embodiment, the various different components of RCM utility 102 may be combined as a single component providing all of the functionality of each of the individual components. The specific functionality associated with each of the software components is presented below. For simplicity, RCM utility 102 is illustrated and described as a single, cohesive component, which provides specific functions, as described below.

In one embodiment, certain features associated with RCM utility 102 may be available via a software deploying server (not pictured), and computer system 110 communicates with the software deploying server via network 148 using network interface 144. Then, RCM utility 102 may be deployed from/on/across the network, via the software deploying server. With this configuration, the software deploying server can perform some or all of the functions associated with the execution of RCM utility 102. Alternatively, the software deploying server may enable computer system 110 to download the executable code required to implement the various features of the described embodiments.

Illustratively, the computer system 110 comprises a networked system. However, the computer system 110 may also comprise a standalone device. In any case, it is understood that FIG. 1 is merely one configuration for a computer system. Embodiments of the innovation can apply to any comparable configuration, regardless of whether the computer system 110 is a complicated multi-user apparatus, a single-user workstation, or a network appliance that does not have non-volatile storage of its own.

The embodiments of the present innovation may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

Computer system 110 is shown comprising at least one processor 112, which is coupled to a bus/interconnect 114 through which processor communicates with other components of computer system 110. As an example, processor 112 obtains instructions, or operation codes, (also known as opcodes), and data via bus 114 from main memory 116, which is also coupled to the bus 114. The processor 112 could be any processor adapted to support the debugging methods of the innovation. In particular, the computer processor 112 can be selected to support the features of the present innovation. Illustratively, the processor can be a PowerPC processor available from International Business Machines Corporation of Armonk, N.Y.

The main memory 116 is any memory sufficiently large to hold the necessary programs and data structures utilized to perform the functions of the described embodiments. Main memory 116 could be one or a combination of memory devices, including Random Access Memory, nonvolatile or backup memory, (e.g., programmable or flash memories, read-only memories, etc.). In addition, memory 116 can include memory that is physically located elsewhere in computer system 110. For example, memory 116 can include any storage capacity used as virtual memory or stored on a mass storage device (e.g., direct access storage device 138) or on another computer coupled to the computer system 110 via bus 114.

The computer system 110 can include a number of operators and peripheral systems as shown. For example, computer system 110 can include a mass storage interface 137 operably connected to a Direct Access Storage Device (DASD) 138, a video interface 140 operably connected to a display 142, and a network interface 144 operably connected to the plurality of networked devices 146 via a network infrastructure (which may include one or more physical connections and/or wireless connection). The display 142 may be any video output device for outputting viewable information.

As shown, the main memory 116 generally includes an operating system 118 and an integrated development environment (IDE) 120. The operating system 118 may be any suitable operating system, which includes a loader 119 for loading programs into memory. The IDE 120 comprises a compiler 122, a linker 124, a coverage tool 126, an editor 128, a debugger 130 and a performance tool 132. The compiler 122 is configured for translating source code (in source code files 152) into machine code (in the form of object code files 154) and the linker 124 is configured to link the machine code together to form a program (represented by programs 156). In the illustrative embodiment, the source code files 152, object code files 154 and the resulting programs 156 are located in a parts repository 150 residing on a storage facility 146$_N$ and accessible to the computer system 110 via a network connection 148. During runtime, coverage data is collected and stored in a coverage data database 160 residing within storage facility 146$_N$. In one or more embodiments, storage facility 146$_N$ may be located on or associated with a remote computer or on the same computer system or on a distributed file system). In one embodiment, an indication of whether coverage data will be collected for a particular code portion is indicated in a part information database 158.

It should be understood that the IDE 120 shown in FIG. 1 is merely illustrative. In other embodiments, the IDE 120 may include more or less components than as shown in FIG. 1. Further, embodiments of the innovation are not limited to integrated development environments and are merely described as such for purposes of illustration.

Figure 2:
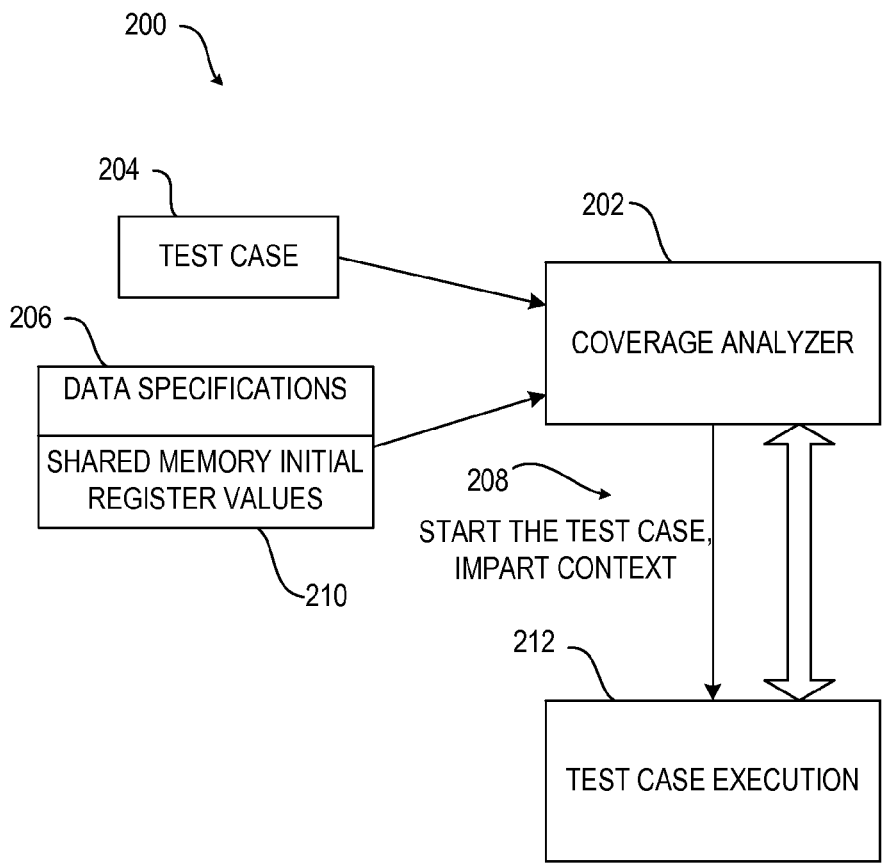
FIG. 2 provides a block diagram representation of a coverage measure system for post-silicon architectural testing of an integrated circuit, in accordance with one embodiment.

With reference now to FIG. 2, there is depicted a block diagram representation of an example coverage measurement system 200, which includes a coverage analyzer/control program 202, a test case 204, and data specifications 206. In one embodiment, (in an operating system environment), the coverage analyzer 202 starts a test case 204 as depicted at 208, and initial register values and memory initialization 210 are set from the data specification. Single-stepping is enabled for test case execution 212. Alternatively, the coverage analyzer 202, functioning as a stand-alone tool residing in system memory, will initiate the test case 204 after initializing the register and memory, as required for test case execution.

The architectural events are defined clearly, and data structures used to record or keep track of the events are established in the coverage analyzer 202. The data structures are populated with initial values. The test case 204, i.e., the specific instruction stream, and the data specifications 206 are fed to the coverage analyzer 202. In one embodiment, the data specifications 206 refers to the data that is to be used for loads and stores and includes the initial register values 210. In one embodiment, the data to be used for loads are presented in a shared memory segment and the data for the stores can also be written to the shared memory segment.

Figure 3:
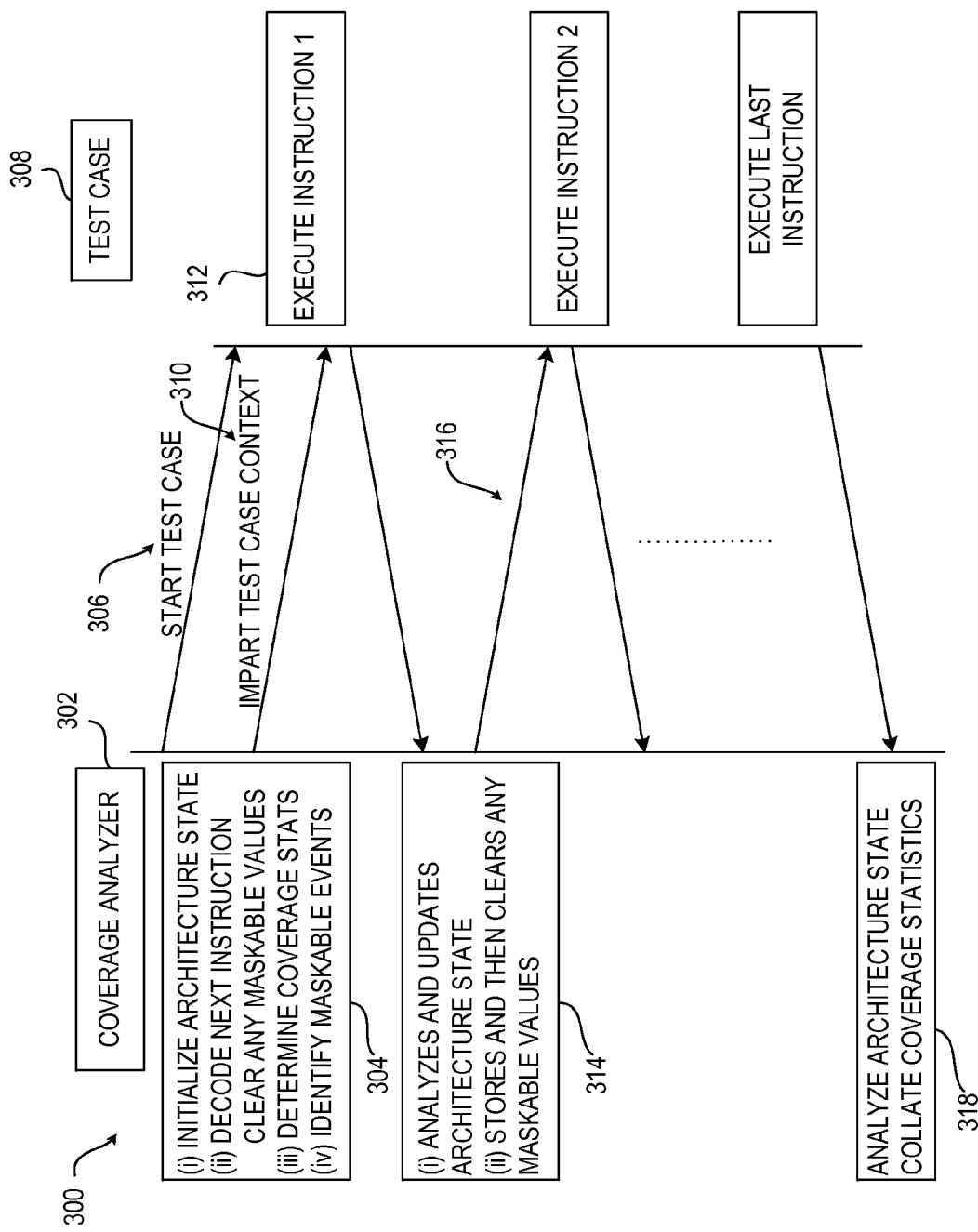
FIG. 3 provides a timing diagram illustrating the processes within the method for coverage measuring, according to one embodiment.

In FIG. 3, a timing diagram 300 illustrates a test case being analyzed entering coverage measurement mode after every instruction execution. The processes illustrated by the timing diagram are described as if being completed by one or both of RCM utility 102 and/or coverage analyzer 202. After each instruction execution, RCM utility 102 takes an architecture state snapshot and performs checks for events that are carried out and for data structures that are modified. In particular, a coverage analyzer 302 performs pre-execution steps that (i) starts the test case (i.e., initializes the architecture state); and (ii) decodes the next instruction, clearing any maskable values (block 304).

With continued reference to block 304, before the execution of every instruction, the utility decodes the instruction word and analyzes the instruction word to determine two types of information. The utility then acts upon the information types. Once the decode function is complete, the coverage statistics discernable from the instruction itself are determined by the utility. For example, one example of coverage events can be derived from instruction: FPR11 (Floating Point Register) is used as InputA, FPR30 used as destination, type of data, instruction type/characteristics). Once the utility completes the analyses, then, the utility identifies the possibility of any architecture state event being masked upon execution.

If the utility determines that there exists a possibility of masking, the utility stores the architecture state that could be masked and clears the entry in order to avoid the masking In one embodiment, the utility maintains a Mask Architecture state data structure, which contains components of the architecture state that could possibly be masked by instruction execution. In one embodiment, this architecture state can simply be ORed with the machine architecture state after any instruction execution. The corresponding event recording can be utilized to restore the cleared values.

For example, in the PowerPC™ architecture, the Floating Point Status and Control Register (FPSCR) has a Floating-point Overflow Exception bit(OX). This bit indicates any overflow caused by an instruction. This bit is sticky, which means the bit will remain set until the bit is specifically reset. Thus, if the FPSCR[OX] is already set, and the decoded instruction is a FP instruction and can set the OX bit, the utility sets the FPSCR[OX] bit in the Mask-Architecture data structure and the utility further clears the bit in the actual architecture state.

The coverage analyzer 302 imparts the start test case as depicted at 306 to device under test (DUT) thus initiating execution of test case 308. The coverage analyzer 302 also imparts the test case context (i.e., initialization of register values from the data specification file) to the testcase 308 as depicted at 310. The test case executes the instruction (block 312).

The coverage analyzer 302 (i) analyzes and updates data structures, and (ii) stores maskable values and then clears the maskable values (block 314). These steps are repeated as depicted at 316 until the test case is complete. Then the coverage analyzer 302 analyzes the architecture state and collates coverage statistics (block 318).

Figure 4:
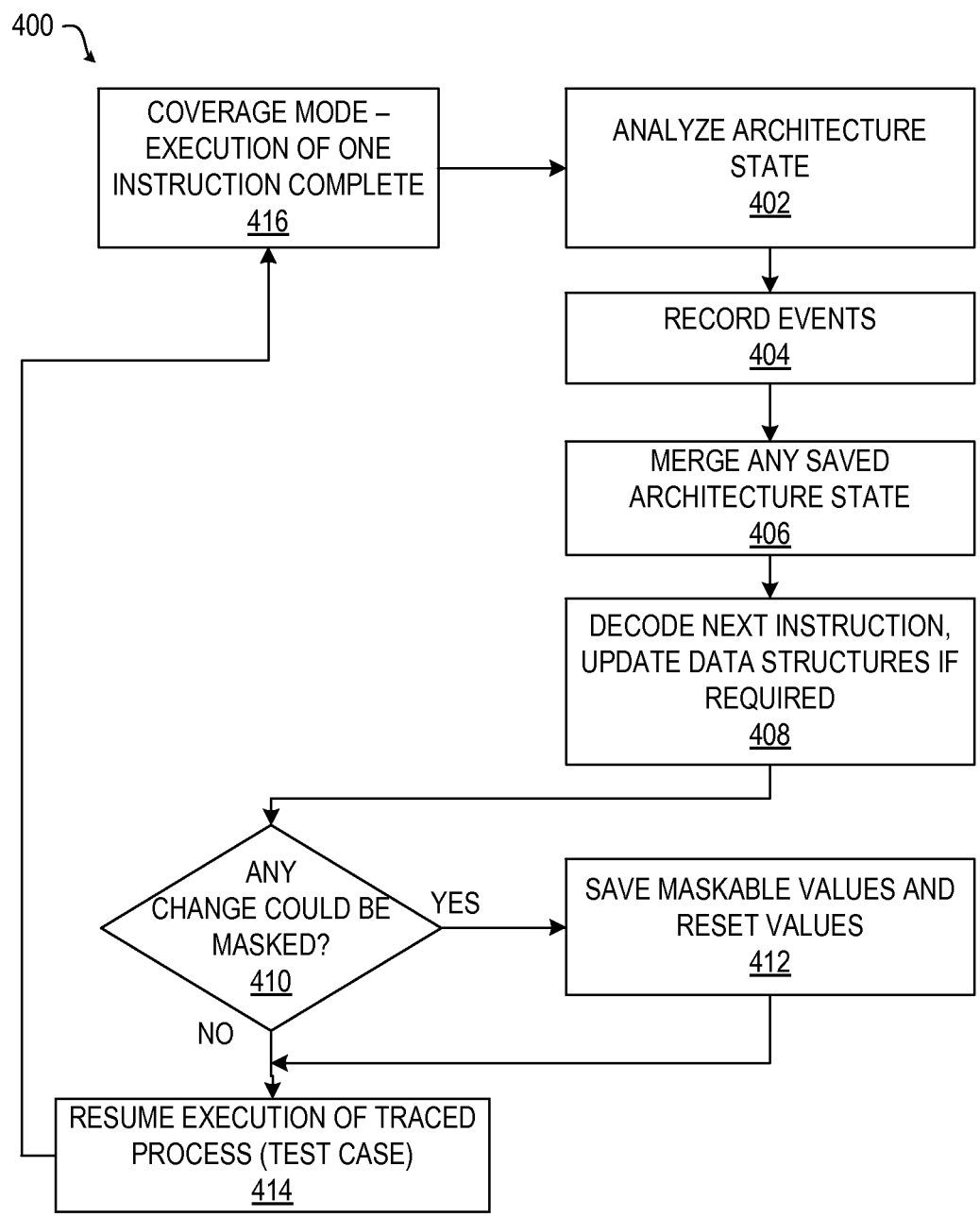
FIG. 4 provides a diagram illustrating the processes within the method for coverage mode between execution steps, according to one embodiment.

In FIG. 4, operation 400 of the coverage analyzer is depicted between single step execution of the test case. An RCM utility analyzes architecture state (block 402). The RCM utility records events (block 404). The RCM utility merges any saved architecture state (block 406). The RCM utility decodes the next instruction and updates data structures as required (block 408). The RCM utility determines whether any change could be masked (block 410). If any of the changes can be masked, the utility saves the maskable value, and the utility clears the maskable value (block 412). Following block 412 or in response to the change not being maskable in block 410, execution is resumed of traced process ("test case") 414. After execution of the instruction is complete, the coverage mode is entered (block 416). Then, processing by the RCM utility continues again from block 402 until the test case is complete.

Figure 5:
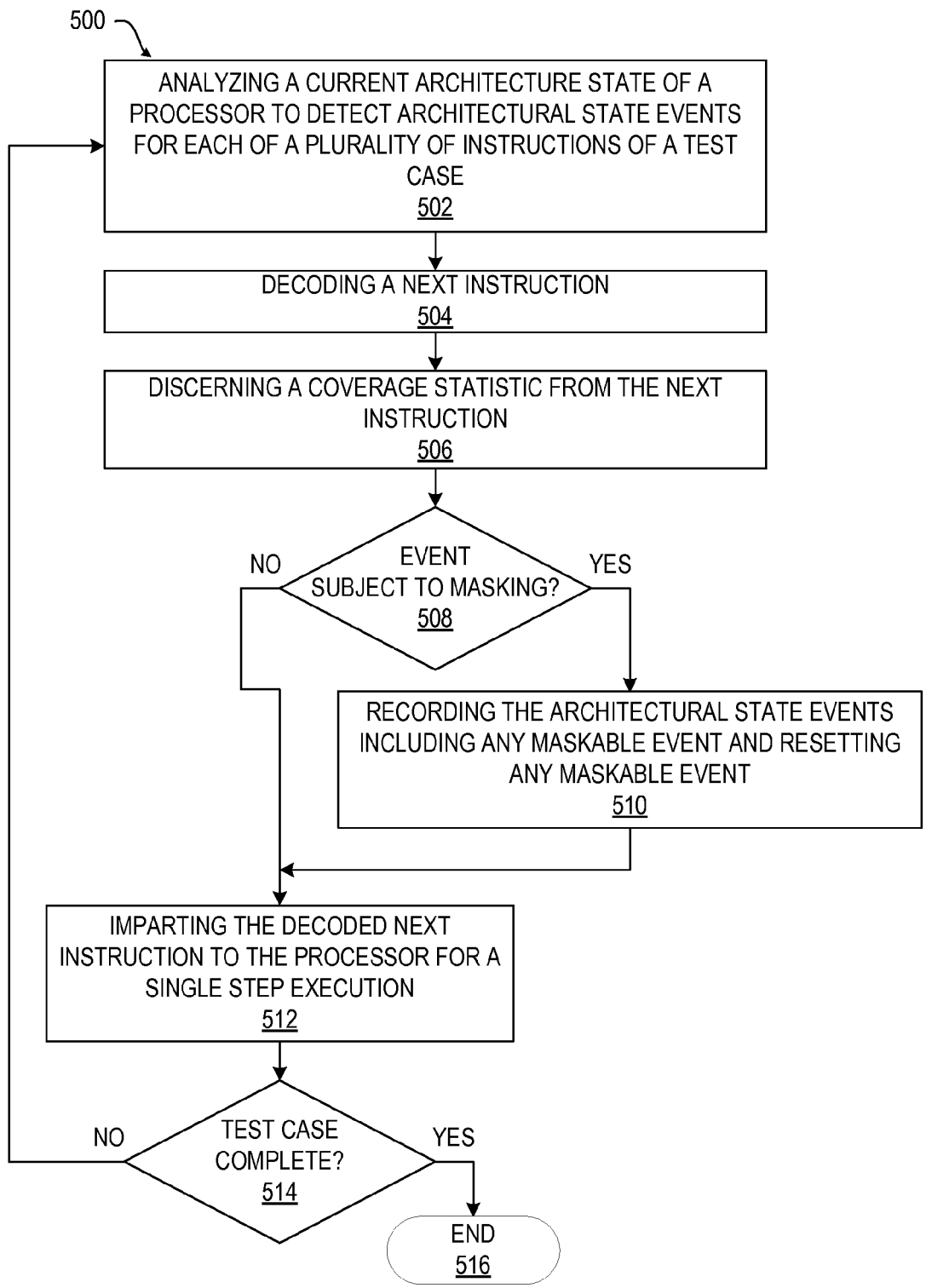
FIG. 5 provides a flow diagram illustrating a methodology for single step coverage measurement of architectural state events with detection of maskable events, according to one embodiment.

In FIG. 5, a methodology 500 is provided for single step coverage measure of architectural state events with detection of maskable events. For each of a plurality of instructions of a test case, an RCM utility analyzes a current architecture state of hardware under test (e.g., a processor) to detect architectural state events (block 502). The RCM utility decodes the next instruction (block 504). The RCM utility discerns a coverage statistic from the next instruction (block 506). A determination is made whether an architectural state event is subject to being masked based on execution of the next instruction (block 508). In response to the architectural state being subject to being masked, the architectural state events are recorded including any maskable event, and RCM utility resets any maskable event (block 510). The RCM utility imparts the decoded next instruction to the processor for a single step execution (block 512). A determination is made as to whether the test case is complete (block 514). If the test case is complete, the process ends (block 516). If the test case is not complete in block 514, then processing moves to block 502 for the next instruction.

Figure 6:
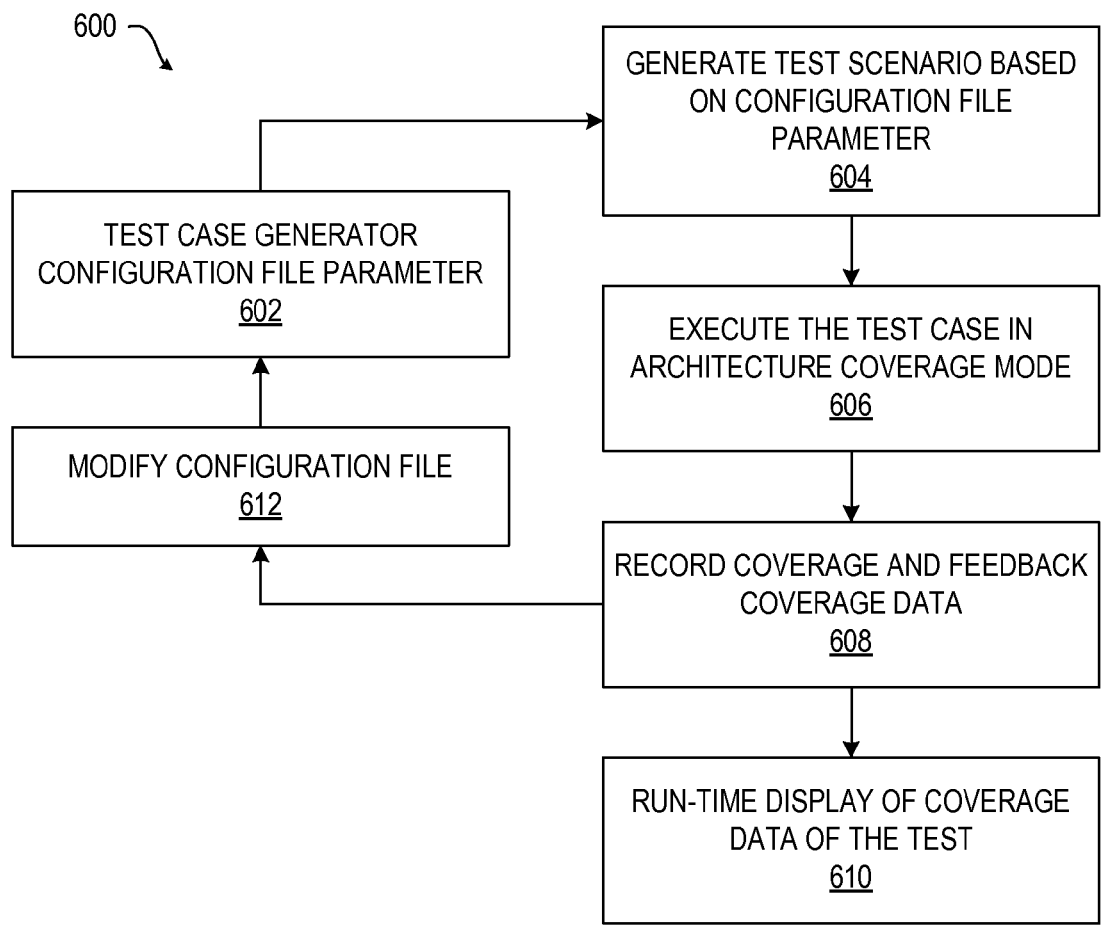
FIG. 6 provides a flow chart illustrating the processes within the method for performing a feedback driven test generation approach using a runtime coverage mode, according to one embodiment.

In FIG. 6, a methodology 600 depicts an iterative sequence of events for a feedback driven test generation approach using a runtime coverage model. The test case generator is driven by a configuration file that specifies parameters (e.g., the mix of instructions, length of instruction stream and other settings which specify the target test scenario) (block 602). The test case/test scenario is thus generated according to the configuration file (block 604). The test case is executed in the architecture coverage mode (block 606). The coverage data is recorded (block 608). The coverage data is presented to the user as a runtime display (block 610). The coverage data is also passed along to a module that modifies ("tweaks") the configuration file parameters to enable more complete coverage as required (block 612).

Figure 7:
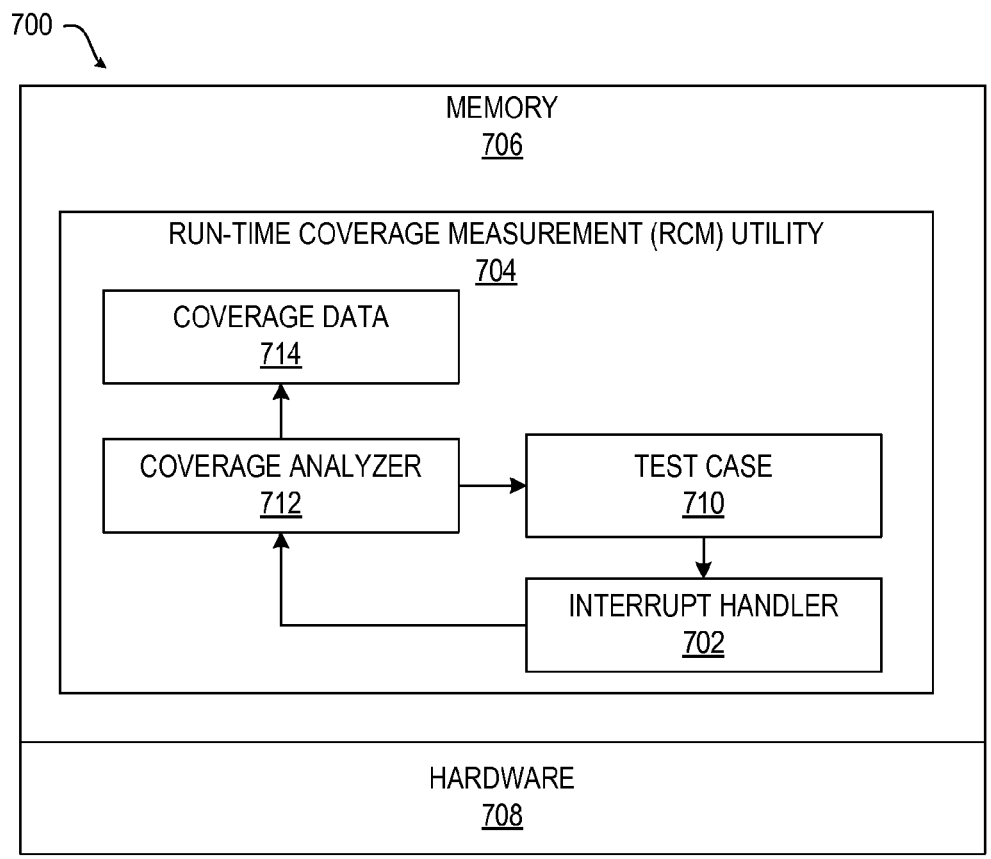
FIG. 7 provides a block diagram representation of an example execution mechanism within which RCM utility executes, according to one embodiment.

In FIG. 7, a standalone (i.e., "bare metal") execution mechanism 700 uses an interrupt handler 702 in one embodiment consistent with aspects of the present innovation. A Runtime Coverage Measurement (RCM) utility 704 resides in a memory 706. For clarity, a single memory 706 is depicted, although the memory 706 can be distributed. The RCM utility 704 tests hardware 708 by single step execution of a test case 710, each step managed by the interrupt handler 702. A coverage analyzer 712 responds to the interrupt by performing the afore-mentioned processing of methodology 600 (FIG. 6) in order to measure coverage data 714.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the innovation. Thus, while the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore not to be taken in a limiting sense, and the scope of the present innovation is defined only by the appended claims.

Thus, as presented by the various embodiments, a method, system and computer program product that implements the above described processes during an integrated circuit (IC) testing, including performing the functions of: (a) for each of a plurality of instructions of a test case: analyzing a current architecture state of test hardware under test to detect architectural state events; decoding a next instruction; discerning a coverage statistic from the next instruction; and determining whether any architectural state event is subject to being masked based on execution of the next instruction, wherein the event that is subject to being masked is a maskable event; (b) recording the architectural state events including any maskable event due to execution of a prior instruction; (c) resetting the maskable event; and (d) forwarding the decoded next instruction to the hardware under test for a single step execution.

According to one embodiment, the method further comprises: determining that the test case is complete; and collating coverage statistics. An additional embodiment includes merging the architectural state events by performing bitwise logical operations between a current architectural state and saved maskable values of a prior architecture state. Still in one embodiment, the utility provides for measuring coverage in the hardware under test during execution of at least one test case. In a first implementation, the measuring of the coverage is performed using a standalone tool, while in a second embodiment, the measuring the coverage utilizes an operating system environment.

In one embodiment, the method further comprises recording the architectural state events including any maskable event in a data structure. Another embodiment provides: feeding back the architectural state events to a test case generator to enable coverage of all tested states in a reduced amount of time. The embodiments further provide generating a live view of architectural event coverage data during execution of the test case.

As will be appreciated by one skilled in the art, aspects of the present innovation may be embodied as a system, method or computer program product. Accordingly, aspects of the present innovation may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present innovation may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present innovation may be written in any combination of one or more programming languages, including an object oriented programming language such as Java, Smalltalk, C++ or the like and conventional procedural programming languages, such as the "C" programming language or assembly level programming or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present innovation may be implemented using any combination of software, firmware or hardware. As a preparatory step to practicing the innovation in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the innovation. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the innovation may be practiced by combining one or more machine-readable storage devices containing the code according to the present innovation with appropriate processing hardware to execute the code contained therein. An apparatus for practicing the innovation could be one or more processing devices and storage systems containing or having network access to program(s) coded in accordance with the innovation.

Thus, it is important that while an illustrative embodiment of the present innovation is described in the context of a fully functional computer (server) system with installed (or executed) software, those skilled in the art will appreciate that the software aspects of an illustrative embodiment of the present innovation are capable of being distributed as a program product in a variety of forms, and that an illustrative embodiment of the present innovation applies equally regardless of the particular type of media used to actually carry out the distribution.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A computer implemented method for integrated circuit (IC) testing, comprising:
    for each of a plurality of instructions of a test case:
        analyzing a current architecture state of test hardware under test to detect a plurality of architectural state events;
        decoding a next instruction;
        discerning a coverage statistic from the next instruction; and
        determining whether any of the plurality of architectural state events are subject to being masked based on execution of the next instruction, wherein an architectural state event that is subject to being masked is a maskable event;
    recording the plurality of architectural state events including any maskable events due to execution of an instruction, from among the plurality of instructions, that is prior to the next instruction;
    resetting the any maskable events; and
    forwarding the decoded next instruction to the test hardware under test for a single step execution.

2. The computer implemented method of claim 1, further comprising:
    determining that the test case is complete; and
    in response to determining the test case is complete, collating coverage statistics of the test case.

3. The computer implemented method of claim 1, further comprising:
    merging the plurality of architectural state events by performing bitwise logical operations between a current architectural state and each of one or more saved maskable values of a prior architecture state.

4. The computer-implemented method of claim 1, further comprising measuring coverage in the test hardware under test during execution of at least one test case.

5. The computer-implemented method of claim 4, further comprising measuring the coverage using a standalone tool.

6. The computer-implemented method of claim 4, further comprising measuring the coverage using an operating system environment.

7. The computer-implemented method of claim 1, further comprising recording the plurality of architectural state events, including the any maskable events, in a data structure.

8. The computer-implemented method of claim 1, further comprising feeding back the plurality of architectural state events to a test case generator to enable coverage of all tested states at a runtime.

9. The computer-implemented method of claim 1, further comprising generating a live view of architectural event coverage data during execution of the test case.

10. A data processing system for integrated circuit testing comprising:
    a processor;
    a computer-readable storage medium for storing a plurality of architectural state events and a test case;
    a utility that executes on the processor to:
        for each of a plurality of instructions of the test case:
            analyze a current architecture state of a hardware under test to detect the plurality of architectural state events,
            decode a next instruction,
            discern a coverage statistic from the next instruction; and
            determine whether any of the plurality of architectural state events are subject to being masked based on execution of the next instruction, wherein an architectural state event that is subject to being masked is a maskable event;
        record the plurality of architectural state events including any maskable events due to execution of an instruction, from among the plurality of instructions, that is prior to the next instruction;
        reset the any maskable events; and
        forward the decoded next instruction to a processor under test for a single step execution.

11. The data processing system of claim 10, wherein the utility provides the further functions to:
    determine that the test case is complete; and
    in response to determining the test case is complete, collate coverage statistics of the test case.

12. The data processing system of claim 10, wherein recording the plurality of architectural state events further comprises the utility executed on the processor to: merge the plurality of architectural state events by performing bitwise logical operations between a current architectural state and each of one or more saved maskable values of a prior architecture state.

13. The data processing system of claim 10, further comprising the utility executed on the processor to measure coverage in the hardware under test during a execution of at least one test case, wherein the measuring is completed via one or more of: a standalone tool and an operating system environment.

14. The data processing system of claim 10, further comprising the utility executed on the processor to record the plurality of architectural state events, including the any maskable events, in a data structure.

15. The data processing system of claim 10, further comprising the utility executed on the processor to:
- feed back the plurality of architectural state events to a test case generator to enable coverage of all tested states at a runtime; and
- generate a live view of architectural event coverage data during execution of the test case.

16. A computer program product comprising:
- a non-transitory computer usable storage medium; and
- program code embedded on the non-transitory computer usable storage medium that when executed by a processor of a data processing system performs the following functions:
- for each of a plurality of instructions of a test case:
  - analyzing a current architecture state of the processor to detect a plurality of architectural state events,
  - decoding a next instruction,
  - discerning a coverage statistic from the next instruction, and
  - determining whether any of the plurality of architectural state events are subject to being masked based on execution of the next instruction, wherein an architectural state event that is subject to being masked is a maskable event;
  - recording the plurality of architectural state events including any maskable events due to execution of an instruction from among the plurality of instructions that is prior to the next instruction;
  - resetting the any maskable events; and
  - imparting the decoded next instruction to the processor for a single step execution.

17. The computer program product of claim 16, wherein the program code further provides the function of:
- determining that the test case is complete; and
- in response to determining the test case is complete, collating coverage statistics of the test case.

18. The computer program product of claim 16, wherein recording the plurality of architectural state events further comprises performing bitwise logical operations between a current architectural state and each of one or more saved maskable values of a prior architecture state.

19. The computer program product of claim 16, said program code further comprising code for measuring coverage in the processor during a course of execution of at least one test case, wherein the measuring is completed via one or more of: a standalone tool and an operating system environment.

20. The computer program product of claim 16, said program code further comprising code for performing one or more of:
- recording the plurality of architectural state events including any maskable event in a data structure;
- feeding back the plurality of architectural state events to a test case generator to enable coverage of all tested states at a runtime; and
- generating a live view of architectural event coverage data during execution of the test case.

\* \* \* \* \*